Dec. 4, 1928.
C. D. CUTTING
1,693,593
UNIVERSAL JOINT
Filed Feb. 28, 1927
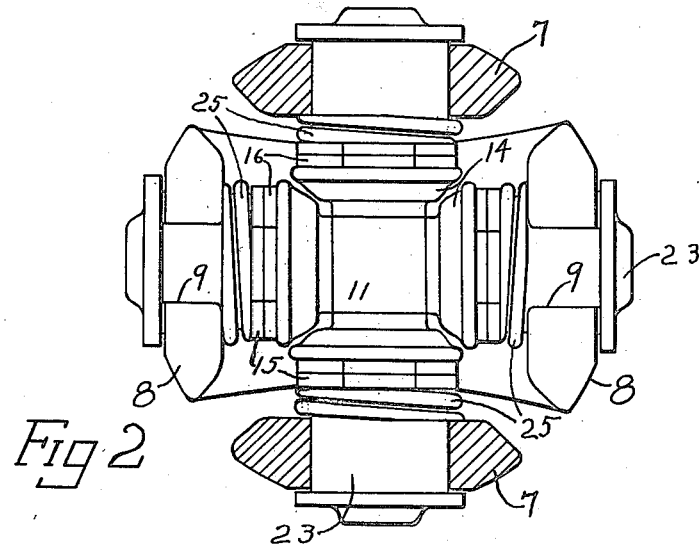
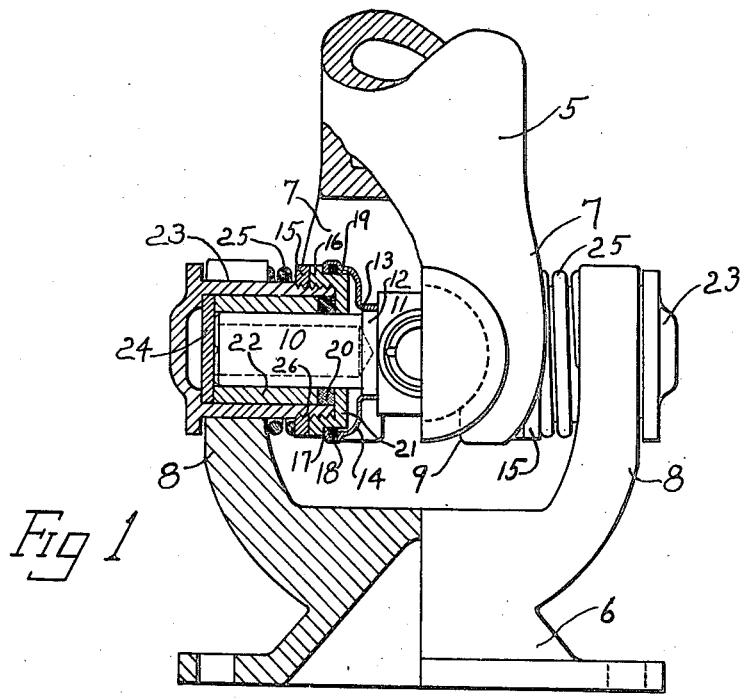
INVENTOR
CHARLES D. CUTTING
BY
*Irving Harness*
ATTORNEY Patented Dec. 4, 1928.

1,693,593

UNITED STATES PATENT OFFICE.

CHARLES D. CUTTING, OF DETROIT, MICHIGAN.

UNIVERSAL JOINT.

Application filed February 28, 1927. Serial No. 171,698

It is the primary object of my invention to provide a joint of simple and economical construction, which may be sealed against oil leakage, which will automatically adjust itself against end wear of the bearing portions and which is adequately sealed against the entrance of small particles of dirt and other foreign matter.

With the above and other objects in view my invention consists in the arrangement, combination and construction of the various parts of my improved device as described in the specification, claimed in my claims and shown in the accompanying drawings, in which:

Fig. 1 is an elevation of my improved device with parts broken away to better illustrate the construction.

Fig. 2 is a top or plan view of the same with parts broken away.

I have shown a pair of shaft members 5 and 6, the former having a pair of yoke arms 7 and the latter a pair of yoke arms 8. Each of the yoke arms is split at its end to provide a slot 9 through which the arm 10 of a Cardan cross member 11 may be inserted. Each of the arms 10 is provided with an enlarged shank 12 around which is fitted the flange 13 of a dust cap or protector 14. Also encircling each of the arms 10 are a pair of lock nuts 15 and 16, the latter having a shoulder 17 against which the opposite end of the cap 14 bears. A washer 18 is provided in the cap 14 bearing against the cylindrical portion 19 of the nut 16.

A felt washer 20 also encircles each of the arms 10 and bears at one side against the flange 21 on the nut 16. On its other side it bears against a bushing 22 around the arm 10 and within a shell 23. A hardened steel washer 24 is provided in each of the shells 23 so as to constitute a bearing to receive end thrust from the arms.

A coil spring 25 encircles the shell 23 and is positioned between the yoke arms 7 and 8 and their complementary nuts 15. Each of the shells 23 is screw threaded as at 26 so that the nuts 15 and 16 may be screwed thereon against the tension of the spring 25.

In the practical operation of my improved device it will be apparent that the lock nuts 15 and 16 may be screwed at any desired tension on the spring 25 so as to hold the shell 23 with its washer 24 against the end of the arm 10. If wear occurs upon the washer 24 it will be automatically taken up by the spring 25 although additional adjustment may be made by further tightening of the nuts 15 and 16.

By reason of the centrifugal action of universal joints of motor vehicles, considerable difficulty has been experienced by the creeping of fine particles of dirt and other foreign matter into the working parts of the joint. This occurs particularly where the foreign matter finds its way to the inner section between the arms of the Cardan cross and the nuts or other securing means thereon because the centrifugal force exerted by rotation of the joint in use naturally tends to carry the same outwardly into the working parts of the joint. The cap 14 will prevent the entering of dirt or other foreign matter in this intersection and it is so arranged that the natural centrifugal action caused by rotation of the shaft will tend to throw foreign matter away from the working parts of the joint rather than into them.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. A universal joint comprising a pair of yokes, a cross member having arms disposed in said yokes, bearings for the arms in the yokes, end thrust bearings for the arms and resilient means for automatically maintaining the thrust bearings against the arms as the parts wear and for maintaining said cross member centrally of said yokes.

2. A universal joint comprising a pair of yokes, a cross member having arms disposed in said yokes, bearings for the arms in the yokes, end thrust bearings for the arms and coil springs encircling the arms bearing at one end against said yokes, adjustable nuts on the arms compressing the springs and means connecting the springs to the thrust bearings whereby they may maintain the bearings in contact with the arms.

3. A universal joint comprising a pair of yokes, a cross member having arms disposed in said yokes, sleeves encircling the arms and having end thrust portions therein for engaging the ends of the arms, springs on the sleeves bearing at one end against the yokes and nuts on the sleeves bearing against the other ends of the springs for resiliently maintaining the thrust portions against the arm ends.

4. A universal joint comprising a pair of yokes, a cross member having arms disposed in the yokes, bearings in the yokes in which the arms are mounted, and dirt protector sleeves on the arms closing the joints between the arms and bearings, said sleeves comprising portions closely embracing the arms and portions flared therefrom and embracing the bearing.

5. A universal joint comprising a pair of yokes, a cross member having arms disposed in the yokes, sleeves on the arms having bearings for the arms, and dirt protector sleeves on the arms embracing the same at one point and the first of said sleeves at another point, and protecting the joints between the sleeves and arms.

6. A universal joint comprising a pair of yokes, a cross member having arms disposed in said yokes, bearings for the arms in the yokes, end thrust bearings for the arms, spring means automatically maintaining the thrust bearings against the arms as the parts wear and maintaining the cross member centrally of the yokes, and means for initially adjusting the tension of said springs.

7. A universal joint comprising a pair of yokes, a cross member having arms disposed in said yokes, cup-shaped sleeves axially slidably received in said yokes about said arms, end thrust bearings for said arms in the bottoms of said cup-shaped sleeves, an adjustable abutment on the inner end of each of said sleeves, and a coil spring surrounding each of said sleeves between its corresponding abutment and the adjacent face of said yoke.

8. A universal joint comprising a pair of yokes, openings in the arms of said yokes, cup-shaped members slidably received in said openings with their closed ends positioned outwardly of said yokes, end thrust bearings in the bottoms of said cup-shaped members, bearing sleeves within said cup-shaped members, a cross having its arms received within said bearing sleeves, adjustable abutments on the inner ends of said cup-shaped members, coil springs surrounding said cup-shaped members between said abutments and the adjacent faces of said yokes whereby to move said end thrust bearings into contact with the ends of the cross arms, and lock nuts for locking said abutment in adjusted position, said lock nuts being provided with inwardly extending flanges forming packing grooves between the same and the adjacent ends of said bearing sleeves.

9. A universal joint comprising a pair of yokes, a cross member having arms disposed in said yokes, bearings for the arms comprising sleeves slidable in the yokes and resiliently pressing means for said bearings on said arms.

CHARLES D. CUTTING.